Nov. 30, 1937. M. O. SCHUR 2,100,651
MANUFACTURE OF CURVIFORM HOLLOW ARTICLES FROM
BINDER IMPREGNATED WATER-LAID FELTS
Filed Aug. 6, 1935 2 Sheets-Sheet 1
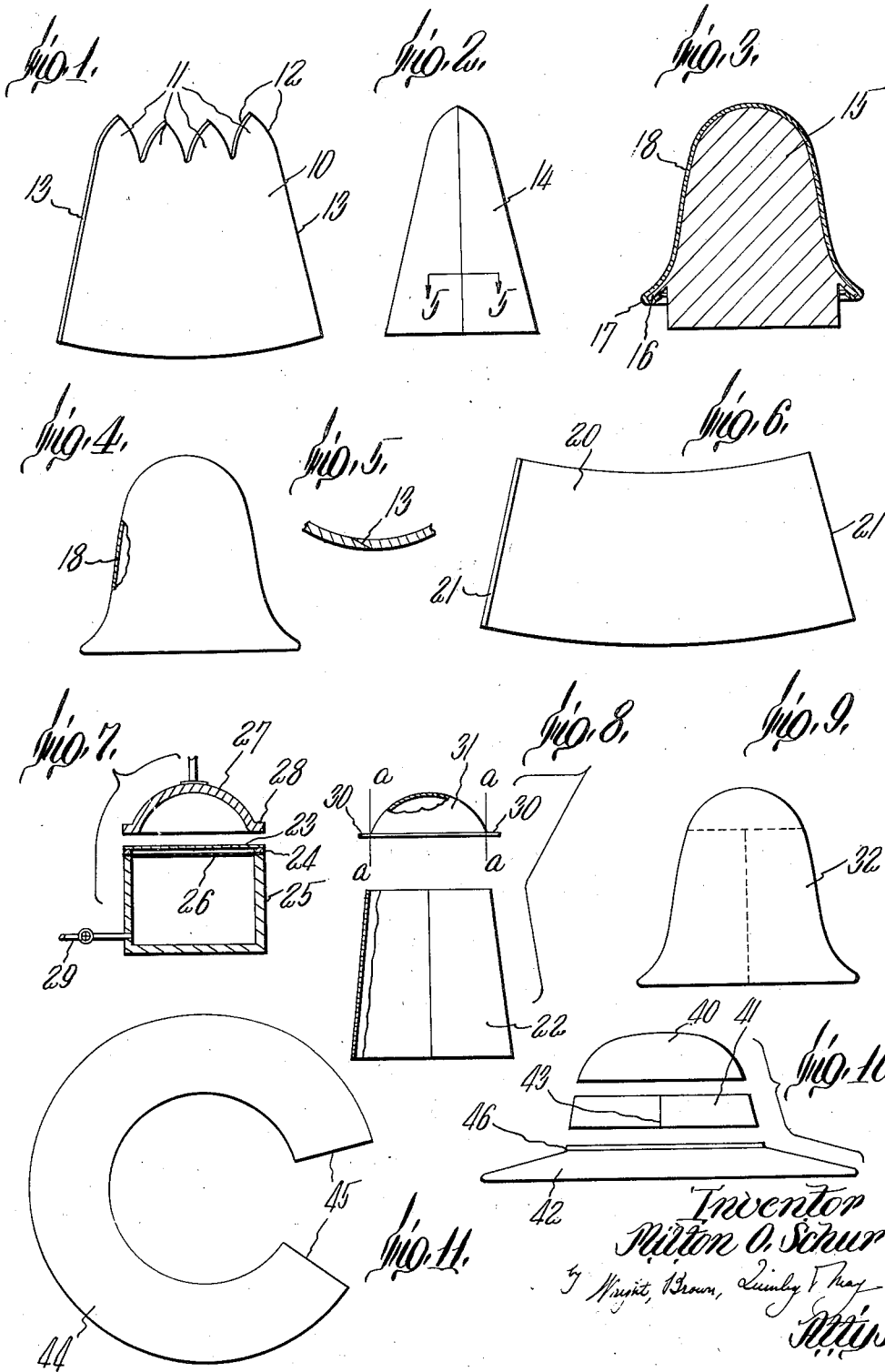

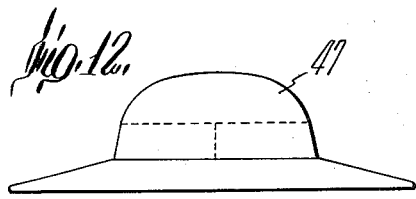
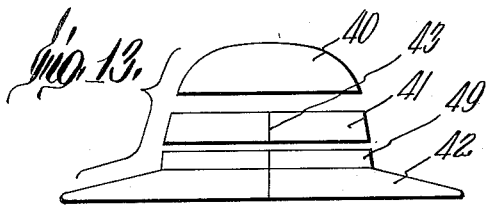
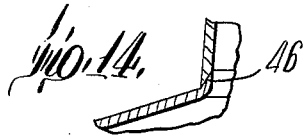
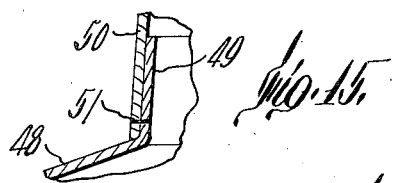
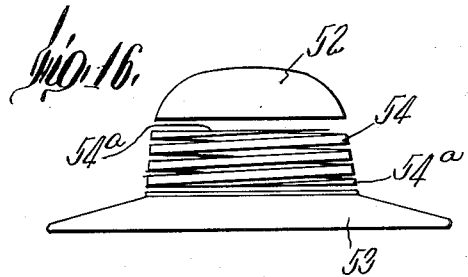
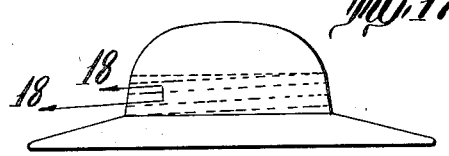
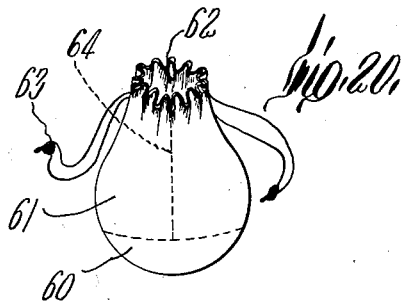
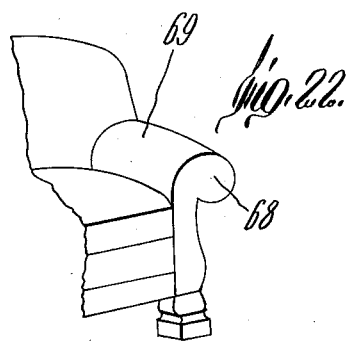

Patented Nov. 30, 1937

2,100,651

UNITED STATES PATENT OFFICE 2,100,651

MANUFACTURE OF CURVIFORM HOLLOW ARTICLES FROM BINDER-IMPREGNATED WATER-LAID FELTS

Milton O. Schur, Berlin, N. H., assignor to Brown Company, Berlin, N. H., a corporation of Maine Application August 6, 1935, Serial No. 34,891

3 Claims. (Cl. 2—194)

This invention relates to the manufacture of curviform hollow articles from binder-impregnated waterlaid felts and is inclusive of both the articles and the method employed in their fabrication. It deals more particularly with the use of binder-impregnated waterlaid felts which are capable of undergoing limited stretch and of setting in stretched condition in the manufacture of such curviform hollow articles as hats, coats, jackets, trousers, puttees, gloves, and other items of wearing apparel, also curvilinear coverings of all sorts, for instance, coverings for boxes or luggage, the seat, back, and arm coverings of chairs, sofas, and other stuffed or upholstered objects, also draw-string bags, such as are used for shielding silverware or objects of art, and miscellaneous other items. An object of this invention is the production of such curviform hollow articles or curvilinear coverings presenting a soft, pliable feel reminiscent of cloth, true felt, or suede, and comprising a minimum number of parts and seams or joints and, indeed, in some instances, consisting of a single seamed piece and even a single seamless piece. Another object is the production of various articles and coverings whose surface simulates in feel and appearance the surface of true felt or suede and whose seams, if any, are practically obscured by finishing or surfacing material applied thereto.

Generally stated, the practice of the present invention involves the steps of cutting the binder-impregnated waterlaid felt into one or more flat blanks of predetermined configuration and of stretching the one or more blanks over or into suitable curviform molds or shaping forms. In the case of articles to be formed up from a number of blanks of predetermined configuration, after the required stretching of the one or more blanks into the desired shape and, if necessary, the forming up of one or more other blanks in any other suitable manner has been effected, the blanks are assembled into the desired article as by cementing, stitching, or the like. The resulting article, whether formed up from a single blank or from a plurality or blanks, can then be finished, if desired, to possess a suede or true felt-like feel and appearance; and when such finishing of an article presenting seam lines is done by a surfacing treatment, as with fiber flock, the seam lines may be substantially completely obliterated, particularly when the seams or joints are so made as to avoid substantial surface irregularity.

While various binder-impregnated waterlaid felts may be used as raw material in the practice of the present invention, yet I prefer to employ a rubber-impregnated waterlaid felt such as is prepared by sheeting refined wood pulp of high alpha cellulose content on papermaking machinery and then impregnating the dried felt with suitable fluent rubber compositions, such as rubber latex compositions, artificial aqueous rubber dispersions, so-called rubber solutions or cements, or their equivalents. Thus, the unimpregnated waterlaid felt may advantageously consist of refined wood pulp of an alpha cellulose content, of, say, at least about 93%, as such felt is comparatively soft and highly absorbent and not only lends itself to ready and uniform impregnation to the desired rubber content but yields an impregnated sheet of the desired pliant, cloth-like qualities. In order to impart the desired stretchability to the impregnated sheet and at the same time to avoid therein undue imperviousness and other distinctive rubbery characteristics, it is preferable to limit within a certain range the amount of rubber introduced as an impregnant into the felt. For the purposes of the present invention, the impregnated felt preferably contains rubber in the amount of 5 to 50%, based on the weight of dry fiber, as at such rubber content the impregnated sheet lends itself to the requisite manipulation and at the same time may have the desired residual porosity or "breathing" qualities. In other words, at such rubber content, the sheet may be far short of its potential rubber-absorbing capacity and it may, indeed, absorb sufficient moisture or water to acquire enhanced softness, stretchability, and moldability, such as facilitates the shaping of the single or plural blanks entering into the fabrication of the ultimate article. It is, of course, possible to vary the mode of manufacture of the rubber-impregnated sheet. Thus, other fibers such as cotton, linen, waste rayon, wool, ramie, jute, ordinary chemical wood pulps of the nature of sulphite and kraft, etc., or a mixture of such fibers may serve as raw material for fabricating the waterlaid felt; and, in some instances, the rubber may be introduced in suitable form into the aqueous fiber suspension or felt-making furnish delivered to the papermaking machine. For instance, rubber latex may be initially flocculated or precipitated and the flocculated or precipitated rubber admixed with the felt-making furnish; or rubber latex or artificial aqueous rubber dispersions may be admixed with the felt-making furnish, flocculated or precipitated directly on the fibers, and the resulting stock run off on the papermaking machine. It is thus seen that the rubber may be introduced as an impregnant into the felt either during the course of fabricating the sheet and/or afterwards. If desired, the rubber latex or other fluent rubber composition employed and/or the felt base itself, may be compounded with glycerine or other softening agent which enhances the pliability, stretchability, and moldability of the impregnated sheet.

Although rubber is the preferred impregnant for the felt, nevertheless it is possible to use as the impregnant other elastic or semi-elastic binders which function equivalently to rubber. Of the non-rubber binders available for the purpose of the present invention, glue-glycerine mixtures or similar aqueous compositions compounded from albuminous binders and glycerine are especially to be recommended. Thus, the felt base may be impregnated with an aqueous composition or solution containing the glue-glycerine mixture in the ratio of, say, 40 parts of glue to 60 parts of glycerine, to produce an impregnated sheet wherein, say, about 30% to 200% of the mixed impregnant, based on the dry weight of fiber, is present. When an article is made from such an impregnated sheet, it is preferable that the article be treated with an agent that tans or insolubilizes the glue. Thus, the shaped article may be immersed in solutions of various vegetable tanning extracts, such as are employed in tanning of natural leather, or various chemical insolubilizing agents such as formalin, solutions of chromic acid, potassium bichromate, etc. In some instances, the article may be treated with the fumes of a tanning or insolubilizing agent, such as formaldehyde vapor.

With the foregoing and other features and objects in view, the present invention will now be described with particular reference to the accompanying drawings, wherein,—

Figures 1 to 4, inclusive, illustrate various stages of formation of a one-piece hat in accordance with the present invention, beginning with a flat blank and ending with a hat shape.

Figure 5 is a section on the line 5—5 of Figure 2.

Figures 6 to 9, inclusive, illustrate the parts and also various stages of formation of a two-piece hat by the practice of the present invention.

Figures 10, 11, and 12, illustrate the parts and some of the stages of manufacture of a three-piece hat embodying the present invention.

Figure 13 shows the three pieces of a similar hat, including, however, a brim piece of slightly modified structure.

Figure 14 is a section through the joint between the brim piece and the side-wall piece of the hat of Figure 12.

Figure 15 is a similar view at the same region of the hat formed from the three pieces of Figure 13.

Figure 16 shows the separate parts of still another form of hat embodying the present invention.

Figure 17 is a front view of the hat elements of Figure 16 assembled into hat shape.

Figure 18 is a section on the line 18—18 of Figure 17, and shows a joint in the side wall of the hat.

Figure 19 is a similar view of a modified form of joint.

Figures 20, 21, and 22 illustrate other curviform articles or parts of articles formed up or shaped in accordance with the present invention.

In forming a hat from a one-piece blank, one may cut the binder-impregnated felt, preferably the rubber-impregnated felt hereinbefore described, into a flat blank of, say, the predetermined configuration shown in Figure 1. Such a blank may assume a generally trapezoidal form at its main body portion 10 and include a narrower upper portion to be formed up into the crown or dome of the finished hat; and such upper portion may comprise a series of similar generally triangular tabs 11 projecting upwardly from the main body portions 10 of the blank and defined by curved side edges 12. The side edges 13 of the main body portion and the adjacent side edges 12 of the tabs 11 may be complementally skived or beveled so that when these edges are treated with a suitable adhesive, such as rubber latex or rubber cement, and brought together into a generally conical shape 14, as shown in Figure 2, a substantially smooth joint or seam, such as appears in Figure 5, will result where the edges overlap. By reason of the permanent compressibility of the binder-impregnated felt, however, it is possible to dispense with skiving of the lapping edge portions and to rely merely upon rolling down or densifying such portions to avoid any sensible protrusion thereat. Or the unskived edges may be brought together to form a butt joint and the adjoining edge portions united by thin adhesive tape applied to the internal and/or external faces, for instance, the extremely thin "cellophane" tapes sold on the market as "Scotch tape". Once the adhesive or cement for joining the lapping edge portions of the conical shape 13 has dried or set, the shape may be stretched over a suitable hat form into the desired hat shape. To this end, it is preferable that the conical shape 13 be preliminarily softened by immersion in water for, say, about ½ to 15 minutes, depending upon the nature and amount of the binder occurring as an impregnant in the felt. The conical shape 13, preferably in water-softened condition, is then stretched over a hat form or block 15, as shown in Figure 3, which form may include near its base a projecting flange or lip 16 under which the marginal or lower edge portion 17 of the shape may be tucked as the shape is being pulled downwardly, stretched, and molded to conform nicely to the external surface of the form 15. The resulting hat shape 18 thus formed may, if moist, be permitted to dry on the form 15; and, in drying, the shape shrinks somewhat and hugs tightly the form so as to assume faithfully its lines or configuration. The resulting hat shape 18 may then be removed from the form 15 and its marginal portion 17 trimmed away. If, however, the hat shape is to be finished to simulate suede or true felt by the surfacing thereof with fiber flock, using a water-miscible or water-compatible binder, such as rubber latex or glue, to bond the fiber flock to the shape, the shape is preferably kept moist on the form until the finishing or flocking operation has been completed. Thus, such binder may be sprayed or otherwise applied to the external surface of the shape, fiber flock of the desired character and color showered thereon in the usual way, and the flocked shape then dried. The flock thus employed as a surfacing or finishing material obscures the seams in the shape and gives it the appearance of the usual seamless felt hat. The hat, may, if desired, be turned inside out and the inside surface finished in the same way or in any other desired manner, whereupon, the shape may be turned right side out and dried, if drying is necessary, on the form. It is, of course, possible to apply other than suede or felt-like finishes to the hat shape, but the flocking of the rubber-impregnated or similar sheet material employed in accordance with the present invention is especially desirable by virtue of the remarkable approach of the finished article to a similar true felt article in such important characteristics as body, feel, appearance, pliability, water-repellency, etc. It might be remarked that the sueding or surfacing of the hat shape with fiber flock may be performed as part of a continuous or semi-continuous system of finishing wherein a large number of shapes are being progressively carried by forms on a continuous conveyor past binder-spraying and flock-showering stations, with rotation, if desired, of the form and the hat shapes carried thereby as they are moving past the stations so as to ensure substantially uniform or perfect finishing. So, too, the drying of the hat shapes may be continuously performed while such shapes are being conveyed through a heated drying chamber. It might be further remarked that the sueding or other finished treatment might be performed locally on the hat shape so as to create desired ornamental effects thereupon, as by applying the binder or fiber flock to the hat shape through suitable stencils. Again, inasmuch as the binder-impregnated felt is permanently compressible, the hat shape lends itself to embossing either before or after the sueding or other finishing treatment, wherefore, the desired ornamental embossed effects may also be produced on the hat shape, particularly while it is still in moist condition. The hat shape may be given a final "blocking" such as customarily done in hat manufacture so as to impart to the brim the desired tilt and/or curvature; and suitable ornaments, such as ribbons, bands, feathers, buttons, buckles, etc. may be fastened to its exterior and a sweatband and/or lining affixed to its interior as is customary in ordinary hat manufacture.

In some instances, it may be desirable to form up the hat from two or more pieces or flat blanks. The use of two blanks, namely, one for forming the dome or crown portion of the hat, and another for forming the side wall and brim portions of the hat is illustrated in Figures 6 to 9 inclusive. Thus, a flat blank 20 of generally trapezoidal shape, such as is shown in Figure 6, may serve for forming the side wall and brim portions; and, to this end its side edges 21 may be cemented together to develop the truncated cone shape 22 shown in Figure 8. Another flat blank of circular or oval outline may be stretched or distorted to dome shape in any suitable manner to develop the crown portion of the hat. While such stretching of the blank might be done on a suitable curviform base, I find it convenient to do so by placing it in a suitable clamp or holder and then bringing it to bear thereagainst a rubber or other stretchable membrane as the membrane is being expanded into globular shape. For instance, as diagrammatically illustrated in Figure 7, the blank 23 may be placed on the annular upper edge 24 of a cylindrical pressure vessel 25 whose hollow interior is closed off by a rubber diaphragm 26 stretched across the walls of the vessel and fixed thereto immediately below its upper edge 24. An internally dome-shaped clamping lid 27 having a clamping marginal edge 28 may be brought down against the edge 24 to grip tightly the marginal edge of the blank 23, whereupon compressed air may be introduced by way of the valved pipe 29 into the interior of the vessel to expand the diaphragm 26 and simultaneously to stretch the blank 23 into contact with the internal dome-shape of the lid 27. The marginal or skirt portion 30 of the resulting dome-shaped part 31 shown in Figure 8 may be trimmed away on the line a—a, as indicated in such figure. The marginal portion of the trimmed piece 31 and the upper edge portion of the piece 22 may then be lapped and cemented together, these lapping portions as well as the lapping edges 21 being skived, if desired, to make smooth joints. The resulting rough hat shape may then be stretched, preferably in a moist soft condition, to conform nicely to the desired hat form to produce the hat shape 32 shown in Figure 9, and the hat shape may then be finished, as already described.

In those instances when a hat with a wide brim is to be fabricated, it may be desirable to assemble three pieces or flat blanks into the hat shape. Thus, the roughly shaped hat parts shown in Figure 10 include a dome-shaped part 40, a side wall or collar part 41 and a brim part 42. The dome-shaped part 40 may be shaped from a flat blank as hereinbefore described. The side wall or collar part 41 may be formed from a flat blank which is cut essentially as a band and whose end edges 43 are cemented together to develop the collar. The edges 43 may be slightly inclined so that when joined the resulting collar will be slightly frustro-conical as shown. The brim part 42 may be molded as an integral or seamless part from an annular flat blank; or it may be formed from a flat blank which, as shown in Figure 11, is an incomplete annular band 44, the sector missing therefrom being of a size designed to permit the development of a distinctly frustro-conically-shaped brim part when the end edges are cemented together to form such brim part 42. The frustro-conically-shaped brim part 42 may be molded so as to effect a sharp bending or turning up of its upper rim into an upstanding flange 46 over which the lower edge portion of the wall part 41 may be abutted and cemented in position, as best appears in Figure 14. The rim 46 may be skived as shown and so, too, the other related or complemental edge portions may be skived prior to being cemented together so as to yield perfectly smooth joints. Once the parts have been assembled into a rough hat shape, the shape may be stretched and molded, preferably in moistened condition, over the appropriate hat form into the hat shape 47 shown in Figure 12. Such a hat shape may then be put through a finishing operation, as hereinbefore described, designed to obliterate its seams and to impart thereto the desired characteristics.

If desired, the upstanding upper rim of the brim part of the hat last described may be made sufficiently wide to serve as a sweat-band. A fragmentary section through a hat so constructed as shown in Figure 15, wherein the brim part 48 is illustrated as being bent sharply upwardly at its upper rim portion to afford an upstanding sweat-band element 49 to whose lower edge portions the lower edge portion of the side wall piece 50 may be secured by a line of stitches 51. As already indicated, stitches may be used in lieu of cement for uniting the other edges of the hat parts, but, other than for securing the sweatband element 49 to the side wall piece 50, it is generally preferable to use cement as the uniting means because the seams formed thereby are least visible, especially when the cemented edge portions are skived or densified to present a joint of the same thickness as the rest of the hat.

The form of hat shown in Figures 16 and 17 is assembled from a preformed crown piece 52, a preformed brim piece 53, and a flat band 54 wound spirally to develop the side walls. The end portions 54a of the band 54 may be suitably tapered to comport with the desired frustro-conically shaped part to be developed from the band. The band may be wound on a suitable form at the same time as the pieces 52 and 53 are carried by the form so as to effect an assembly of the hat parts at the same time as the side walls are being developed; or the band may be independently formed upon a mold into a side wall structure of frustro-conical shape and then assembled with the other pieces into the hat shape. In order to permit smooth joining of the adjacent edges of the successive windings or convolutions, they may be complementally skived and cemented together, as indicated at 55 in Figure 18. On the other hand, the overlapping edge portions of the successive windings may be cemented together in unskived condition and the joints compressed or rolled down to substantially the same thickness as the rest of the wall portion, as indicated at 56 in Figure 19. Of course, the hat assembly is brought to the desired final hat shape and may be finished, as hereinbefore described.

As already remarked, a large variety of curviform articles other than hats may be made pursuant to the present invention from flat blanks. Typical of such other articles are those illustrated in Figures 20, 21, and 22. Thus, as shown in Figure 20, a draw-string bag may be assembled from two pre-shaped parts or blanks, namely, a semi-spherically-shaped bottom part 60 and a generally globularly-shaped side wall or upper part 61 containing an opening 62 at its top near the margin of which the draw string 63 is threaded. The part 60 may be shaped in the same way as the crown portion of a hat; and the part 61 may be formed by cutting a flat blank of predetermined configuration and stretching it over a mold of predetermined contour designed to yield a shaped blank, which, when cemented together at the edges 64, yields the part 61 of the contour shown appropriate for cemented assembly with the part 60 into a bag. In a similar way, the sleeve 65 of the jacket shown in Figure 21 may be shown by stretching a flat blank of predetermined configuration over a form to yield when cemented, stitched, or otherwise united at its edges 66 a sleeve shape of a flared contour toward a cuff piece 67 forming part of the complete sleeve assembly. Other parts, for instance, the back and front parts of the jacket, coat or similar item of wearing apparel with which the sleeve is to be assembled may be preliminarily stretched or shaped over the appropriate curviform bases to acquire the desired final contour or lines before being stitched together or otherwise assembled into the completed item of wearing apparel. In Figure 22 is shown a fragment, namely, the end portion of an upholstered or stuffed sofa, the arm 68 of which is covered by a curvilinear piece 69. Such a curvilinear covering piece may be formed by stretching and molding a suitably cut flat blank over a form whose contour corresponds to that of the arm 68 to be covered. Other parts of the sofa covering may be similarly pre-shaped preparatory to assembly in cemented, stitched, nailed, or other united relationship on the sofa.

Any one of the miscellaneous items hereinbefore described may be surface-finished either in the form of its constituent parts or elements or in assembled relationship. In the case of hats, however, it is preferable to surface-finish the assembled parts so as to obscure their seams. In some instances, as in the case of shallow hats, such as resemble the so-called coolie hats, the hat shape may be formed by stretching and molding a suitably configured integral blank or flat piece over a hat form into a seamless hat shape or by drawing the blank into a suitable hat-shaped die or mold. In any event, however, the finishing treatment is preferably performed on the curviformed article or the pre-shaped individual parts of the article so as to avoid the necessity of undue stretching or piecing subsequent to the finishing treatment such as might tend to injure the finish.

In making multi-piece hats, or other articles, it is, of course, possible to use binder-impregnated felts of different weights or thicknesses or degrees of stiffness for the various pieces. Thus, in the case of a multi-piece hat, the brim part may be made from a sheet of greater stiffness and/or weight than that used for the side wall and crown portions. Generally speaking, the waterlaid felt base may be of a thickness ranging from about 10 to 60 mils and of a basis weight, prior to impregnation, ranging from about 25 to 150 pounds. The expression "basis weight" is used herein in the conventional paper-making sense to denote the weight of 480 sheets whose dimensions are 24x36 inches, that is, the weight of 2,880 square feet of sheet material.

It is possible to deviate from the particular materials and procedures hereinbefore described while adhering to the principles and spirit of the present invention as defined in the appended claims. Thus, under certain conditions, it may be advantageous to use a creped, binder-impregnated, waterlaid, fibrous sheet as the base material to be formed up into the desired article, particularly since such sheet is very highly stretchable and has what may be termed a high permanent set, that is, a tendency to retain in large measure its stretched shape and/or dimensions, particularly when stretching is performed in the presence of added moisture in appreciable amount and the stretched structure is permitted to dry or set on the curviform base or block whose outline or external aspect is that to be assumed by the finished article. In lieu of using a single ply binder-impregnated, waterlaid, fibrous sheet as the base material, it may be desirable to use a sheet made up of a plurality of plied or superposed relatively thin sheets or tissues, preferably individually creped plies of a porous texture, which plies may be built up into the plied sheet in unimpregnated condition and then impregnated or in already-impregnated condition.

I have hereinbefore indicated that the pre-cut flat blanks are assembled after the one or more blanks to be formed up into the article have undergone an initial stretching or shaping operation. Thus, in the case of a hat, I have stated that the part or blank to constitute the crowned portion is preferably stretched or distorted into dome shape prior to assembly with the one or more other parts to serve as the side wall and brim portions, with pre-shaping also, of the latter flat part or parts, if desired. However, it is not essential that the stretching or shaping be done on the flat parts or blanks prior to their assembly. On the contrary, the flat blanks of the appropriate predetermined configuration may be assembled into crude article form, as on the shaping mold or on a suitable assembly block, whereupon the assembly may be subjected to the necessary stretching and molding forces on the mold or block whose contour is that of the article to be developed from the assembly. For instance, in the case of a hat, the side wall and brim portions may originate as one or more flat blanks, as hereinbefore described, developed initially into, say, the frustro-conical part 22, shown in Figure 8, or, say, the two roughly-shaped hat parts 41 and 42, shown in Figure 10. A flat blank of, say, circular or oval outline may then be joined at its marginal portion to either the upper edge of the frustro-conical part 22 or the upper edge of the part 41, the part 41 being previously or subsequently joined to the part 42. The resulting crude hat shape has a flat top which may be readily stretched into the desired ultimate dome shape during the hat-shaping operation which may be effected on the usual hat-shaping form or block. Rather than using a flat blank of circular or oval outline for developing the crowned portion of the hat and bands of such dimensions as to encompass the side wall and/or brim portions of the hat-forming mold, I may develop the hat shape from, say, three or more pieces, including, say, a central piece of the appropriate curvature designed to extend from one side edge of the mold to the opposite one so as to develop opposite brim and side wall portions as well as a crown portion, and two or more side pieces having marginal edges complemental to opposite edges of the central piece and adapted to be united or assembled with the central piece to furnish the remaining opposite side and brim portions of the hat assembly. The resulting hat assembly may then be stretched as hereinbefore described over the appropriate shaping form or block into final hat shape.

I have already adverted to the fact that stretching of either the individual parts of the assembly or the assembly is preferably effected after such parts or the assembly have undergone a moistening or softening treatment, but it may be desirable in some instances to moisten only one or more localized portions of the blanks or the assembly, thereby fostering stretching of the moistened portion or portions to a greater degree than the dry portions. The best course to pursue as regards the localities to be moistened depends upon the particular curviform structures to be developed.

It is to be observed that one aspect of my invention resides in the surfacing with fiber flock of a fibrous foundation as a single piece, either intact or seamed, or as a multi-piece assembly of predetermined configuration, while it is in hat shape on a hat-forming mold or block, at least a portion of such piece or pieces to constitute the crown portion of the hat overlying in stretched condition the dome portion of the mold or block. In other words, the fibrous foundation of predetermined configuration is associated with the hat-shaping mold while causing that portion of the foundation overlying the dome-shaped portion of the mold to be stretched to dome shape, whereupon surfacing of the foundation with fiber flock is effected while the foundation is thus associated with or carried by the mold. So far as concerns this aspect of my invention, the fibrous foundation of predetermined configuration may be other than binder-impregnated waterlaid felt, for instance, an unimpregnated waterlaid felt, an impregnated or unimpregnated airlaid or carded web of suitable fibers, or even woven or knitted fibrous fabric possessed of the appropriate stretchability and other qualities. The surfacing with fiber flock may be performed as ordinarily, that is, by spraying or otherwise applying the desired binder, say, rubber latex, rubber cement, glue, nitrocellulose cement, etc., to the hat-shaped base or foundation while supported on or associated with the mold and then showering the fiber flock on the foundation as its carrying mold is undergoing the rotation, vibration, or other motions usually imparted thereto to ensure uniform coverage of the foundation with the fiber flock preparatory to drying the binder so as to anchor the fibers.

Various degrees of feel or pliancy may be imparted to the hat during the surfacing thereof with fiber flock by controlling the character of the binder used therefor. Thus, when rubber latex serves as the binder, not only may glycerine or other softening agent be added thereto, as hereinbefore indicated, to enhance the softness and pliancy of the hat, but such stiffening agents as glue, casein, viscose, waterglass, etc., may be added thereto to appreciate stiffness quality in the hat; and such softening or stiffening effects may be created either locally or over the entire hat structure.

So far as concerns the step of compressing the joints or edges of the seams of a seamed single piece or multipiece structure designed to constitute a hat or other curviform hollow article, I might observe that such step may be practiced either after the piece or pieces have been wet or before. In certain cases, however, binder-impregnated waterlaid felt compressed in dry state tends to recover a substantial proportion of its original thickness, yet tends to remain practically permanently reduced in thickness when compressed in a wet state and then dried. In such latter cases, therefore, I effect the compression or rolling down of lapping joint portions or the seam lines presented thereby preferably to a degree such that they cannot readily be felt with the fingers while the material is sufficiently wet to retain practically fully its compressed thickness upon subsequent drying.

An important advantage gained by the practice of the present invention is that the waterlaid felt base employed pursuant thereto can be made at comparatively low cost on the high speed papermaking machinery available for such purpose and that such a base may be continuously and rapidly impregnated with the appropriate binders and dried to produce the stock from which are cut the flat blanks adapted to be formed up into the articles of the present invention. In other words, the economies incident to the manufacture and impregnation of a flat sheet of paper may be realized in accordance with the present invention in the production of articles imitative of comparatively highly expensive curviform articles, such, for example, as genuine felt hats or curviform suede articles, while at the same time realizing finished articles whose feel, appearance, pliability, water-repellency, and, indeed, general utility approach closely the comparatively very expensive genuine articles.

I claim:

1. A hat having a cup-shaped portion, said hat comprising binder-impregnated waterlaid felt of cellulose fibres capable of undergoing limited stretch in the presence of moisture and of setting in stretched condition, the cup-shaped portion of said hat comprising originally flat paper web material, as said binder-impregnated waterlaid felt, stretched in the presence of moisture into cup-shaped form and set in such form, said hat being of soft, cloth-like feel and pliancy.

2. A hat having a cup-shaped portion, said hat comprising rubber-impregnated waterlaid felt of cellulose fibres capable of undergoing limited stretch in the presence of moisture and of setting in stretched condition, the cup-shaped portion of said hat comprising originally flat paper web material, as said rubber-impregnated waterlaid felt, stretched in the presence of moisture into cup-shaped form and set in such form, said hat being of soft, cloth-like feel and pliancy.

3. The method of forming a hat from binder-impregnated waterlaid felt of cellulose fibres capable of undergoing limited stretch in the presence of moisture and of setting in stretched condition, which comprises forming flat paper web material, as said binder-impregnated waterlaid felt, cutting said material into a plurality of blanks capable of being assembled into a hat, stretching one blank in the presence of moisture and forming it into cup shape over a curviform mold, and assembling said blanks, including said cup-shaped blank, into said hat.

MILTON O. SCHUR.